Oct. 15, 1935.　　　　R. B. BOURNE　　　　2,017,744
SOUND ATTENUATING DEVICE
Filed April 30, 1934　　　　6 Sheets-Sheet 1
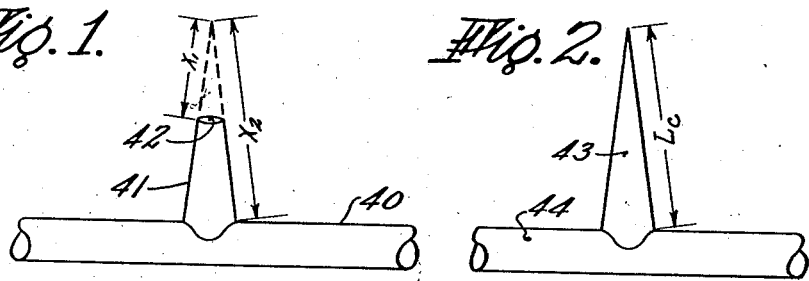
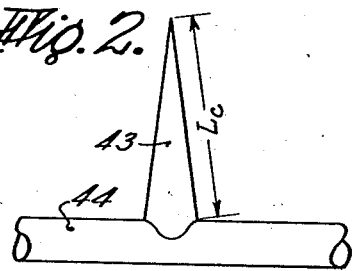
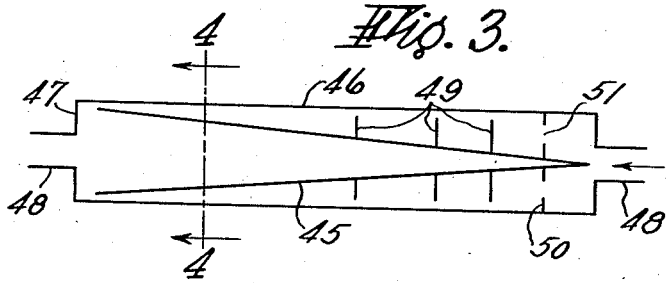
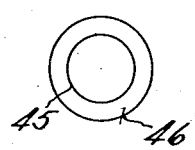
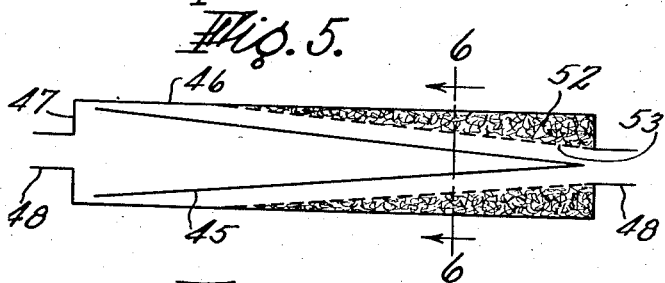
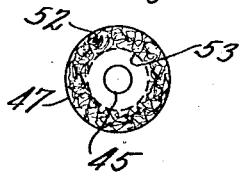
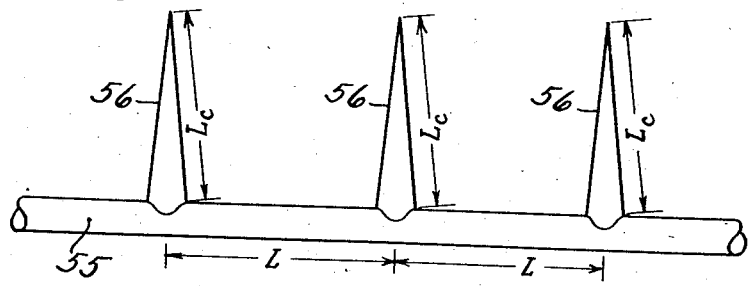
INVENTOR
ROLAND B. BOURNE
BY Chapin & Neal
ATTORNEYS

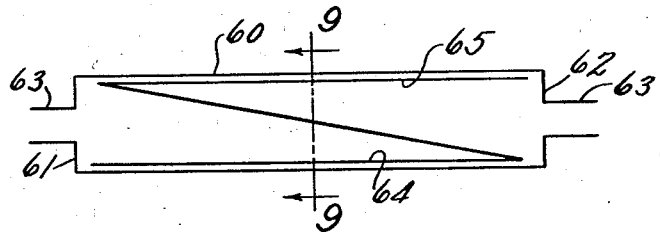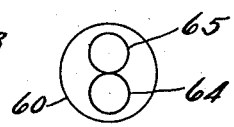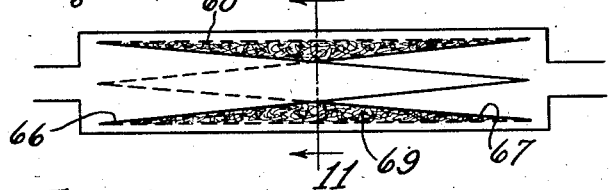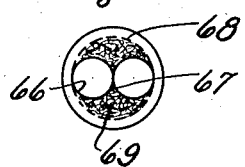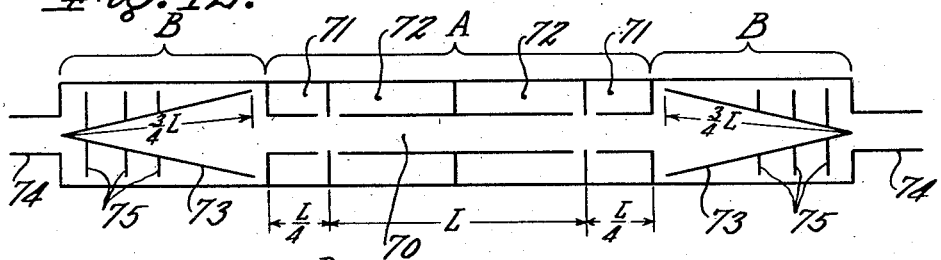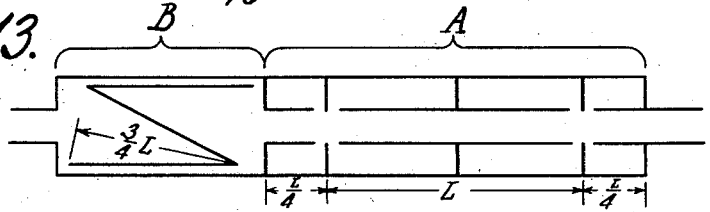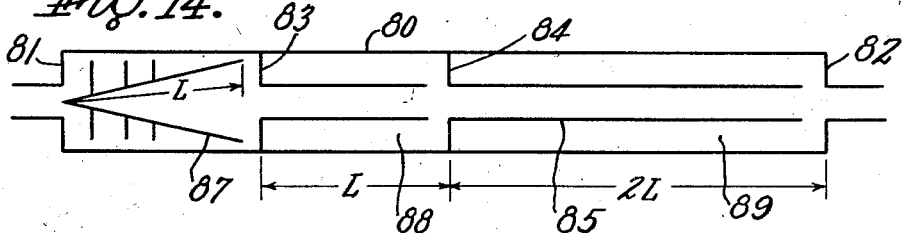

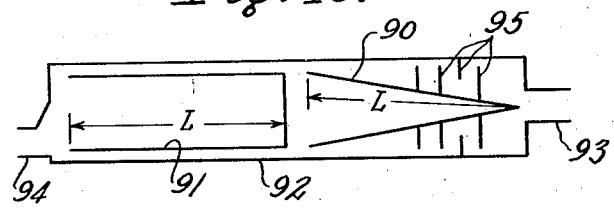
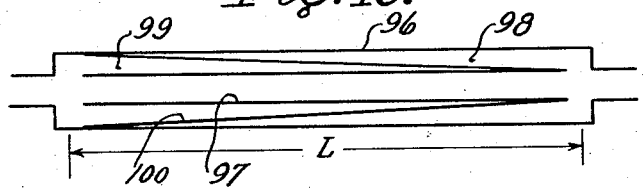
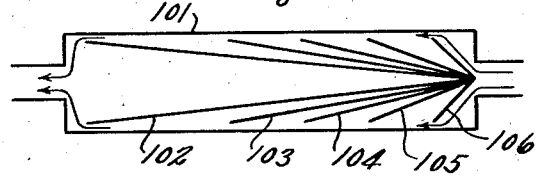
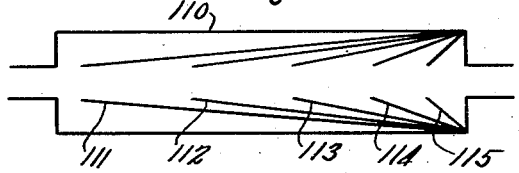
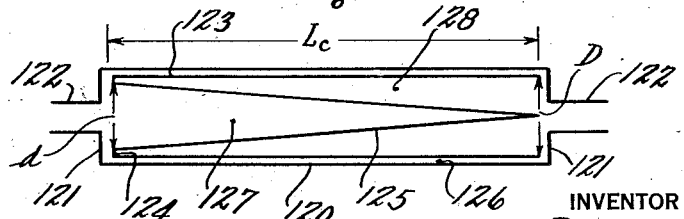
INVENTOR
ROLAND B. BOURNE
BY Chapin & Neal
ATTORNEYS

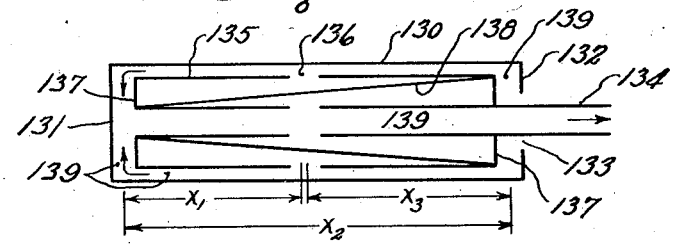
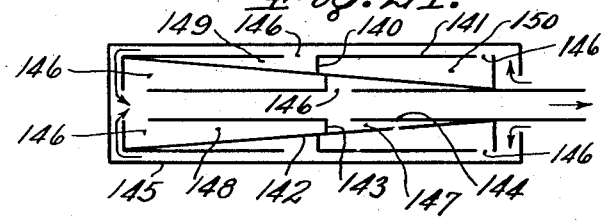
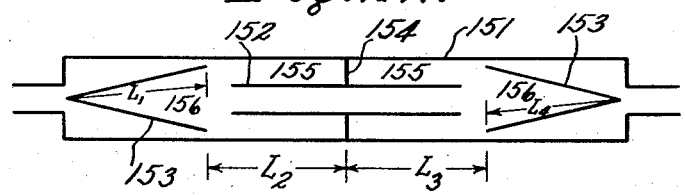
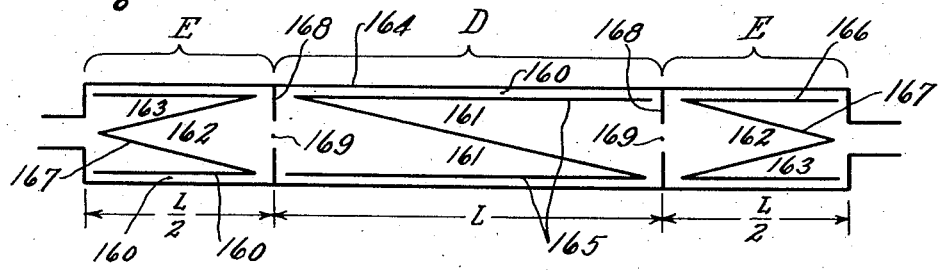

Oct. 15, 1935.    R. B. BOURNE    2,017,744
SOUND ATTENUATING DEVICE
Filed April 30, 1934    6 Sheets-Sheet 5

INVENTOR
Roland B. Bourne
BY Chapin + Neal
ATTORNEYS

Oct. 15, 1935.    R. B. BOURNE    2,017,744
SOUND ATTENUATING DEVICE
Filed April 30, 1934    6 Sheets-Sheet 6

INVENTOR
ROLAND B. BOURNE
BY
Chapin & Neal
ATTORNEYS

Patented Oct. 15, 1935

2,017,744

UNITED STATES PATENT OFFICE 2,017,744

SOUND ATTENUATING DEVICE

Roland B. Bourne, Hartford, Conn., assignor to The Maxim Silencer Company, Hartford, Conn., a corporation of Connecticut Application April 30, 1934, Serial No. 723,085

57 Claims. (Cl. 181—0.5)

The present invention relates to sound attenuating devices of the reactive type wherein one or more acoustic sidebranches capable of showing resonance phenomena are coupled acoustically to a main conducting channel or other enclosure wherein may occur sound waves which are to be attenuated. A primary purpose of the invention is to provide acoustic sidebranches having novel characteristics, and to show how the acoustic characteristics of these sidebranches may be used in connection with the design of sound wave attenuating apparatus. A further purpose of the invention is to show how these characteristics may be applied to the design of silencers for use in connection with the exhausts or intakes of internal combustion engines, air compressors, blowers and the like. Further purposes and objects of the invention will be disclosed as the specification proceeds.

The acoustic sidebranches which are the main subject of this invention are designed and used on the basis that progressive change of phase as a function of distance occurs therein. For the purposes of the invention they will be referred to as "linear sidebranches". As an example of a sound wave attenuating device employing linear sidebranches having progressive change of phase therein, reference is made to Bourne, United States Patent No. 1,910,672, May 23, 1933.

There are in general, two types of linear sidebranches, i. e., those open at both ends, called "open" linear sidebranches and those closed at one end, called "closed" linear sidebranches. When acoustic sidebranches are used in connection with silencers for internal combustion engines and the like, the use of an open sidebranch may not be feasible since both exhaust gas and sound can leave through the open end. The open type sidebranch possesses certain acoustic properties, however, that make it desirable from an acoustic point of view. It is well known that a cylindrical tube of uniform cross sectional area, open at both ends, is substantially one-half wave length long for its fundamental natural period or frequency and also resonates to all substantially harmonic overtones thereof, both even and odd, whereas the closed tube of uniform cross sectional area is approximately one-quarter wave length long for its fundamental frequency and responds to odd harmonics thereof only.

Where reactive sidebranches are used as attenuating means for sound waves associated with exhaust and intakes of internal combustion engines and the like, it is desirable to offer attenuation not only to the fundamental frequency of the sound, but also all its overtones. It is obvious that an acoustic sidebranch which will respond to and attenuate a full series of harmonic tones and be entirely closed except for the point at which it is coupled to the sound-bearing enclosure or conduit is very desirable. Heretofore, it has been impossible to combine the advantages of a closed linear sidebranch with one showing a response to a full series of harmonic overtones, both even and odd.

I have discovered that a sidebranch in the form of a complete cone, open to the main sound channel at its large end and of course closed off at its pointed end, will respond to and attenuate a complete series of harmonic overtones which are substantially multiples of the lowest frequency for which it resonates. In one aspect of the invention I employ such complete cones as closed linear sidebranches in an acoustic silencing device, these sidebranches responding to and attenuating in the main channel or enclosure to which they are acoustically coupled, bands of frequencies, more or less wide, corresponding to and dependent upon the fundamental frequency of the conical sidebranches and all substantially integral multiples thereof, both even and odd. In another aspect of the invention I employ as sidebranches, in an acoustic silencing device, structures having a cross sectional area decreasing with the distance from their junction point with the main channel, sufficiently slender to give substantial attenuation to at least one consecutive overtone of their fundamental frequency, and having an opening into the main channel large enough to make the side branch operate mainly as a linear acoustic element. Certain of these structures will be complete cones, certain others truncated cones closed at their smaller end, and certain others annular conical chambers which simulate truncated cones in their operation.

To more fully understand the invention, reference is now made to the drawings, in which Fig. 1 shows a truncated cone with open base, acoustically coupled to a main conducting channel;

Fig. 2 shows a complete circular cone, continued to the apex, acoustically coupled at its base to a main conducting channel;

Fig. 3 shows in diagrammatic form a sound attenuating device embodying a single complete cone open at its base;

Fig. 4 is a section on line 4—4 of Fig. 3;

Fig. 5 is a view similar to Fig. 3 showing a modification;

Fig. 6 is a section on line 6—6 of Fig. 5;

Fig. 7 shows an acoustic wave filter embodying a plurality of complete cones spaced at intervals along the length of a main conducting channel and acoustically coupled to the channel at their bases;

Fig. 8 shows a sound wave attenuating device employing two complete cones, both open at their bases;

Fig. 9 is a section on line 9—9 of Fig. 8;

Fig. 10 is a view similar to Fig. 8 showing a modification;

Fig. 11 is a section on line 11—11 of Fig. 10;

Figs. 12 and 13 show acoustic wave filters having special properties, each employing conical sidebranches;

Figs. 14 and 15 show sound wave attenuating devices employing both conical and other sidebranches, and having theoretically no regions of zero attenuation;

Figure 24:
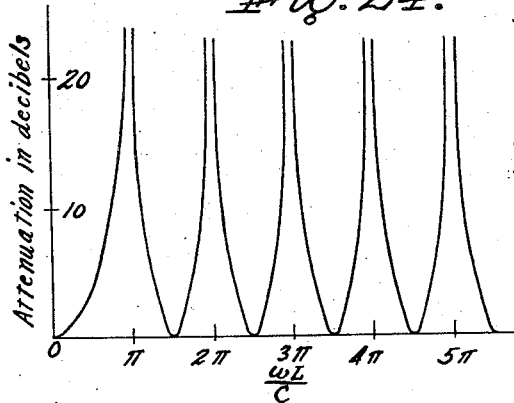

Figs. 16 to 21 inclusive show various embodiments of the invention employing either complete or truncated cones as side branches;

Figs. 22 and 23 show acoustic wave filters employing conical sidebranches; and

Figs. 24 to 30 inclusive show theoretical operating characteristics of some of the devices illustrated in the preceding figures.

In order to understand the operation of the devices of the invention it is useful to make use of impedance relations, since the operation of sidebranches in general can be completely expressed in terms of the acoustic impedance "looking into" the branch.

For a truncated cone such as is shown in Fig. 1, the impedance per unit area at the base, or point of coupling to the main channel $40$, in terms of the dimensions of the cone $41$ having a partition or header $42$ a distance $x_1$ from the apex and a slant length of $x_2-x_1$ may be mathematically shown to be $$Z_s = -i\sqrt{P_o\gamma\rho}\,\frac{\omega x_2}{C}\left[\frac{\sin\frac{\omega}{C}(x_2-x_1)+\frac{\omega x_1}{C}\cos\frac{\omega}{C}(x_2-x_1)}{\sin\frac{\omega}{C}(x_2-x_1)+\frac{\omega x_1}{C}\cos\frac{\omega}{C}(x_2-x_1)-\frac{\omega x_2}{C}\cos\frac{\omega}{C}(x_2-x_1)+\frac{\omega^2}{C^2}x_1 x_2 \sin\frac{\omega}{C}(x_2-x_1)}\right] \quad (1)$$

In the above equation the symbols have the following significances, which hold true also for the further equations below with the changes and additions there noted:

$Z_s$ = acoustic impedance looking into the sidebranch.

$f$ = frequency of sound wave.

$\omega = 2\pi f$.

$C$ = velocity of sound in the medium.

$i = \sqrt{-1}$.

$P_o$ = mean pressure of the sound transmitting medium.

$\gamma$ = ratio of the specific heat of the medium at constant pressure to that at constant volume or, for waves of large amplitude, a function of this ratio.

$\rho$ = density of the medium.

$x_1$ = slant distance from the apex of the cone to its closed end (see Fig. 1).

$x_2$ = slant distance from the apex of the cone to its junction with the main conducting channel, allowing for any necessary end correction.

It may be noted, in order to permit comparison with formulas for other types of silencing units given by different authors, that $$-i\sqrt{P_o\gamma\rho} = -i\rho C$$

In Fig. 1 the conical sidebranch is connected to the main channel at its larger end, and diminishes in cross sectional area in a direction away from the main channel. In the case of a true cone this change in cross sectional area is a simple function of the distance, while for certain sidebranches to be described below, the area depends upon the distance from the channel in a somewhat more complex manner. It should be noted particularly that the sidebranch decreases in area in a direction away from the main channel, as the performance is entirely different if the cone is turned with its small end toward the channel. As will now be shown Equation (1) may be used as the basis for determining many of the acoustical characteristics of either truncated or complete cones connected to the channel at their large ends.

In Fig. 2, the truncated cone of Fig. 1 is continued to the apex. In this figure, the cone $43$ of length $L_c$ is acoustically coupled to the main conducting channel $44$. In this case, $x_1=0$, whence substituting for $x_2$ its equivalent $L_c$, Equation (1) reduces to $$Z_s = i\sqrt{P_o\gamma\rho}\left(\frac{1}{\cot\frac{\omega L_c}{C}-\frac{1}{\frac{\omega L_c}{C}}}\right) \quad (2)$$

or $$Z_s = i\sqrt{P_o\gamma\rho}\left(\frac{\tan\frac{\omega L_c}{C}}{1-\frac{\tan\frac{\omega L_c}{C}}{\frac{\omega L_c}{C}}}\right) \quad (3)$$

To find the natural frequencies of such a cone, I place $Z_s=0$.

To satisfy this relationship, whence  $\tan\frac{\omega L_c}{C}=0$ $$\frac{\omega L_c}{C}=\pi,\ 2\pi,\ 3\pi,\ \text{etc.}=n\pi$$

where $n$ is any positive integer, either even or odd. Therefore $$L_c = \frac{n\lambda}{2},$$

a result identical to that applying to a cylindrical tube open at both ends commonly called an "open" tube.

I now have an acoustical resonating device, completely closed except for an opening whereby it may be acoustically coupled to a main conducting channel and capable of being used to attenuate certain groups of sound frequencies comprising a fundamental group and all multiples thereof, both even and odd. The use of the term group rather than frequency is justified by the fact that resonating devices of the acoustic type exert their influence not only upon the theoretical single frequencies of resonance but also upon neighboring frequencies. The exact nature of the behavior of this type of resonating device under various conditions will be disclosed as the specification proceeds, and the advantages of certain specific arrangements will be shown.

In order to show the attenuating effect of a complete cone acoustically coupled to a main conducting channel upon sound waves therein, it is proper to first investigate the performance of a single such sidebranch, coupled to a relatively long main conducting channel. The attenuation in decibels may be shown to be $$Ndb = 10\log_{10}\left[1+\left(\frac{S_2}{2S_1}\right)^2\left(\cot\frac{\omega L_c}{C}-\frac{1}{\frac{\omega L_c}{C}}\right)^2\right] \quad (4)$$

where $S_2$ is the area of the base of the cone.

$S_1$ is the area of the main conducting channel.

A plot of Equation (4) is shown in Fig. 24, for the condition that $S_2/S_1=4$.

In order to obtain a larger area for the base of the cone than exists in the main conducting channel, the cone may be disposed within a casing after the manner shown in Fig. 3. In this embodiment, the cone 45 is supported within the casing 46 in any convenient manner, making due allowance for the passage of gas between the base of the cone and the casing and between the end of the cone and the header 47. The specific supporting construction in this and succeeding views is not shown in detail as it is not necessary for a complete understanding of the invention. It is seen that the open base of the cone is located directly opposite to and closely adjacent the opening in the header 47 leading into the channel 48 which forms part of the main conducting channel through the device. In this particular embodiment of the invention, the space between the outside of the cone and the inside of the shell or casing is utilized to the purpose of attenuating sounds of relatively high frequency, such as bang and hiss noises usually associated with internal combustion engine exhausts. I have shown a simple baffle plate system 49 to represent such a high frequency attenuating means. Many arrangements of passageways, partitions, etc. may be used to advantage in this regard. The apex of the cone may be supported either by brackets or by a partition 50 extending from the casing to the cone and having therein holes 51 for the passage of the gas therethrough. It is theoretically preferable, in this and other embodiments, that the sidebranch retain its conical shape up to the point of coupling to the main channel. In some cases, however, it may be desirable for constructional reasons to depart from the normal conical shape adjacent the zone of coupling. The departure from the theoretical response occasioned by this slight change in shape will in most cases be of no practical consequence.

In Figs. 5 and 6 a similar construction is shown, except that the high frequency sound attenuation is accomplished by the use of sound absorbent material 52 confined between the casing 46 and the perforated sheet metal liner 53. For certain purposes this arrangement may be preferred to that shown in Fig. 3.

Referring again to Fig. 24 it is seen that maximum attenuation occurs at values of $$\frac{\omega L_c}{C} = \pi, 2\pi, 3\pi, 4\pi,$$

etc., which is the same as would be obtained for an "open" cylindrical tube of the same length. Such a tube would have an attenuation peak at zero frequency. It is to be noted that the conical sidebranch does not offer attenuation to zero frequency, the attenuation decreasing continuously from a high value at $$\frac{\omega L_c}{C} = \pi$$

to zero at $$\frac{\omega L_c}{C} = 0,$$

as shown. The points of zero attenuation are not midway between the points of maximum attenuation, as they are in the case of the "open" cylindrical sidebranch, but are displaced slightly therefrom, the displacement becoming less as the frequency increases. It can be shown, by a consideration of Equation (4) that the condition for zero attenuation is given by the relation $$\tan \frac{\omega L_c}{C} = \frac{\omega L_c}{C}$$

The first few roots of this equation are known to be $$0, 1.4303\pi, 2.459\pi, 3.471\pi$$

It is seen that these successive values show a decreasing difference from the midway points, namely $1.5\pi$, $3.5\pi$, etc. approaching $$\frac{n\pi}{2}$$

as a limit, where $n$ is any odd integer. It is to be noted at this time that the area under the curve is larger as the ratio $S_2/S_1$ is made greater; and, since this area represents a measure of the usefulness, in attenuating sounds of many frequencies, of the device for which the curve shows operating characteristics, it is frequently desirable to make $S_2$ as large compared with $S_1$ as is commercially feasible with proper regard for the limitations imposed by acoustic theory.

Conical sidebranches of the types described above may be used to form acoustic wave filters. An idealized acoustic wave filter of this type is shown in Fig. 7. It comprises the main conducting channel 55 having openings at intervals (L) along its length, at which points the conical sidebranches 56, of length $L_c$ are acoustically coupled thereto. The attenuation-frequency characteristics may be shown to be given by $$\cosh \Gamma = \cos \frac{\omega L}{C} + \frac{S_2}{2S_1} \sin \frac{\omega L}{C} \left( \cot \frac{\omega L_c}{C} - \frac{1}{\frac{\omega L_c}{C}} \right) \quad (5)$$

where $S_2$ and $S_1$ have their usual meanings, $\Gamma$ is the propagation constant and shows attenuation in napiers for real values of $\cosh \Gamma$. To convert from napiers to the more usual decibel it is only necessary to multiply by 8,686.

Figure 25:
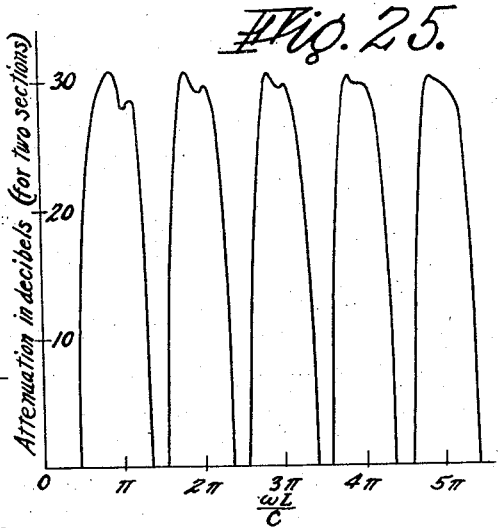

A plot of Equation (5) is shown in Fig. 25. The ordinates are in decibels for two sections of such a filter and the curve is plotted for the condition that $L=L_c$ and $S_2/S_1=4$. It will be noted that the attenuation does not extend to infinity as is the case of the curve shown in Fig. 24. The shape of the curve in Fig. 25 is due to the fact that both the sidebranches and main channel between sidebranches are substantially of the same length. In the case of the curve shown in Fig. 25, the centers of the attenuation bands are displaced slightly toward zero frequency, the displacement becomes less as the term $$1/\frac{\omega L_c}{C}$$

of the Equation (5) becomes smaller with increasing frequency.

Two practical realizations of acoustic wave filters operating as shown in Fig. 25, are shown in Figs. 8 to 11. In Fig. 8, the device comprises a casing 60 with end headers 61 and 62, having inlet and outlet connections 63, and two interiorly disposed complete cones 64 and 65 nested as shown with the apex of one at the base of the other. The surfaces of the two cones may touch along an element common to both, although this is not essential to the operation of the device. In Fig. 10, which illustrates a generally similar construction, the space between the outside of the two cones 66 and 67 and a perforated sheet metal cylinder 68, extending from the base of one cone to the base of the other, is filled with sound absorbing material 69, whereby additional attenuation for sound of high frequency, etc. is obtained. The presence of the sound absorbing material 69 distributed along the main channel between the open end of the cone 67 and the open end of the cone 68 modifies the operation of the two section filter thus formed and Equation (5) no longer strictly applies, since the derivation of this equation is based upon the assumption that no dissipative losses occur in the elements comprising the filter sections. The acoustical properties of the device are changed not only because the sound absorbing material offers attenuation to those sound waves passing through the main channel but also because its presence changes the interaction between the main channel and the sidebranches and, to a greater degree, the interaction between the sidebranches themselves. Since the dissipative main channel is in series with both sidebranches for sound frequencies involved in the filtering action, it is readily seen that all of the sound absorbing material between adjacent sidebranches is effective in modifying this action. The effect of the dissipative material 69 is to introduce attenuation into and eliminate any clean pass bands that occur in accordance with Equation (5) and to reduce the peak attenuation in the attenuation bands. The magnitude of this effect depends upon the absorptive properties of the material used. Thus, as far as the action of the dissipative main channel is concerned, the device of Fig. 10 functions in a different manner new to the art, compared to a device such as shown in Fig. 5. In both designs, ample area for the passage of gas is allowed around the outside of the interiorly nested cones. Any suitable means for mounting the cones within the casing may be used. It is seen that the entering gas flows directly at the open end of a conical sidebranch. Experience has shown that the cone will not only not "sound off" or whistle under this condition, but that it will act as an expansion chamber for gas puffs and exert considerable attenuating effect upon sounds of relatively high frequency.

Figure 26:
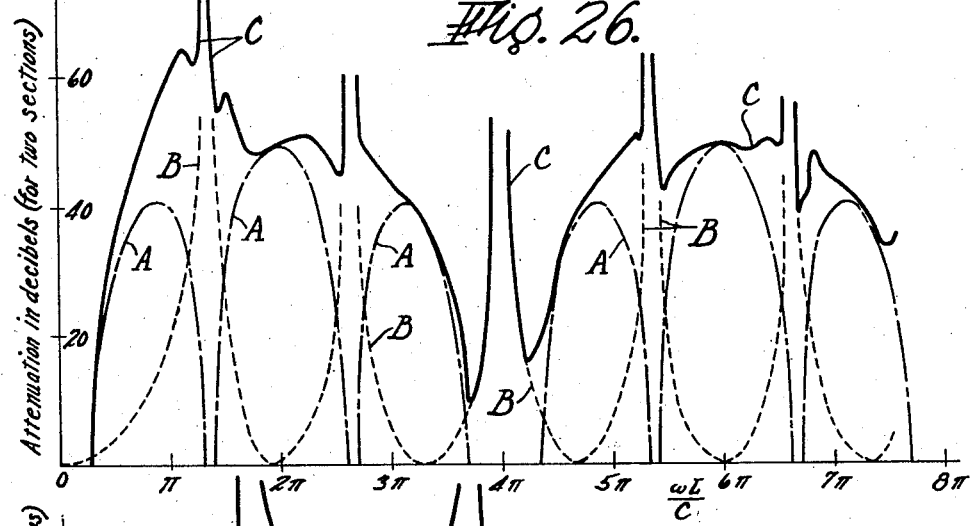

Figs. 12 and 13 show acoustic wave filters of the type disclosed in U. S. Patent No. 1,910,672, above referred to, and employing therewith, a terminating structure embodying the principles of the present invention. In Fig. 12 this wave filter is represented by the portion A and the terminating structures are shown at either end thereof, as B. The filter A comprises a main conducting channel 70 having at points along its length a series of pairs of unequal sidebranches 71, 72 coupled to the main channel in parallel as shown in Fig. 3 of said patent. The terminating structures B are also enclosed in the main casing, and are generally similar to that shown in Figs. 3 and 4. Each terminating structure comprises a cone 73 with its large end open and adjacent the channel 70 and its closed apex pointing towards the end couplings 74. Similarly to Fig. 3, baffles 75 may be located around each of the cones. Now, the filter A has been shown in said patent to have pass bands located in harmonic relation at values of $$\frac{\omega L}{C} = \frac{4}{3}\pi, \frac{8}{3}\pi, \frac{12}{3}\pi,$$

etc., or in the ratio 1, 2, 3, etc. By making the lengths of the various elements in the complete device bear the relations shown in Fig. 12, the centers of the attenuation peaks of the two end structures B will coincide with the pass bands of the intermediate structure A. Fig. 26 shows the extent of the overlapping of the attenuation characteristics for the two devices. Curve A is plotted for the filter A while curve B is plotted for two sections of the structure B, both in decibels. Curve C shows the combined effect of sections A and B.

In order to obtain a more even attenuation throughout the frequency spectrum, use may be made of the devices of Figs. 8 or 10 in conjunction with the filter A of Fig. 12. Such a device is shown in Fig. 13, in which the terminating structure B of Fig. 8 is associated with the filter A of Fig. 12 as shown with their relative dimensions as indicated. The resulting frequency-attenuation curve for the complete device is shown at J in Fig. 28, the action of parts A and B individually being shown at G and H. It is to be noted that while there are no points of infinite attenuation as is the case in the curve of Fig. 26, the points of minimum attenuation show much higher values. The total attenuation throughout the frequency range is more nearly a constant. This device represents a very practical commercial embodiment of the invention. It renders the problem of design for specific requirements in the field very simple, since it is not necessary to know what frequencies are present, nor the temperature of the exhaust gases, if the device is to be used for silencing the exhaust of an internal combustion engine. The devices of Figs. 12 and 13 may be supplied to industrial users of silencers with complete assurance that a high degree of noise reduction will result, no matter what the local conditions, and in spite of the fact that exhaust gas temperature is ordinarily a factor in the design of silencing equipment, the velocity of sound being dependent upon it.

Another embodiment of the invention resulting in a frequency attenuation characteristic having no regions of zero attenuation except near zero frequency, is shown in Fig. 14, which comprises a casing 80, end headers 81, 82, internal headers 83, 84, a centrally disposed conduit 85 forming part of the main conducting channel through the device; and a conical member 87 of slant length L disposed within the casing and preferably so mounted that the open base thereof is opposite to and closely adjacent one end of the conduit 85. By this construction the main conduit 85 is coupled both to the cone 87 and to the two cylindrical side branches 88 and 89 of length L and 2L, respectively. The order in which the various sidebranches occur is not of great importance. In some cases, it is desirable to include a third cylindrical sidebranch of length 4L, in order to reduce the minimum values of attenuation for the complete device. For the embodiment of the invention as shown in Fig. 14 the attenuation is expressed by $$Ndb = 10\left[\log_{10}\left(1+\left(\frac{S_2}{2S_1}\right)^2 \tan^2\frac{2\omega L}{C}\right) + \log_{10}\left(1+\left(\frac{S_2}{2S_1}\right)^2 \tan^2\frac{\omega L}{C}\right) + \log_{10}\left\{1+\left(\frac{S_2}{2S_1}\right)^2\left(\cot\frac{\omega L}{C}-\frac{1}{\frac{\omega L}{C}}\right)^2\right\}\right] \quad (6)$$

Figure 30:
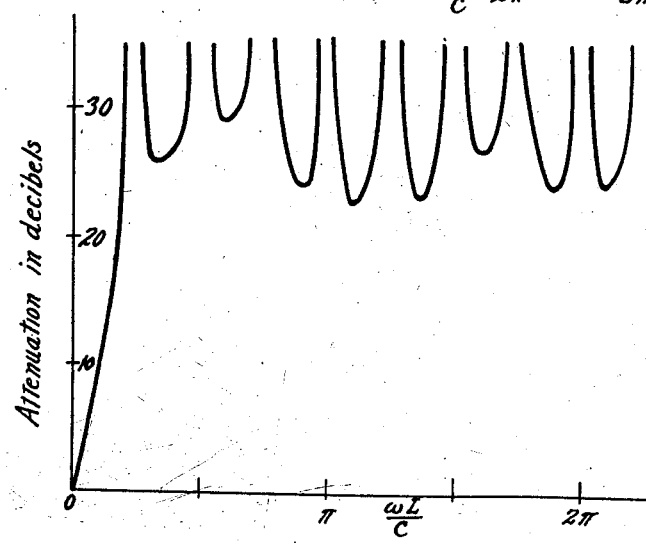

A plot of Equation (6) for $S_2/S_1=4$, is shown in Fig. 30. It may be said that the basic criterion for a device of this type is the use of a number of closed cylindrical sidebranches in conjunction with at least one conical sidebranch having a slant length equal to the length of the shortest of the closed cylindrical sidebranches, the lengths of the several cylindrical sidebranches bearing the ratio to each other as 1:2:4 etc. It is to be noted that the term "length" as used herein, means acoustic length, which may differ from physical length by an amount dependent upon end corrections and/or other factors. Obviously the degree of attenuation offered by the device may be increased by using more than one sidebranch of given length or by increasing the ratio $S_2/S_1$. The combination of acoustic sidebranches above described is simple to construct and may be readily designed for commercial production to embrace every sound frequency likely to be encountered in any industrial application where a silencing device is required, offering at the same time a high average attenuation for all such frequencies.

Fig. 15 shows a special embodiment of the invention wherein use is made of one conical sidebranch 90 of length L, in conjunction with one cylindrical closed sidebranch 91 of length L, both suitably mounted and disposed within a casing 92 having a centrally disposed inlet connection 93 and an eccentrically disposed outlet connection 94. The cone 90 has a simple baffle system 95 attached thereto after the manner of the device shown in Fig. 3. This arrangement of the interior of the device permits the use of water admixed with the exhaust gas and the automatic draining thereof when the silencer is suitably installed. It provides a continuous band of attenuation over the frequency spectrum with peaks of attenuation in harmonic relation whereby proper design causes known frequencies in the exhaust to suffer maximum attenuation.

Fig. 16 shows an extremely simple embodiment of the invention comprising a casing 96, a main conducting channel 97 centrally disposed within said casing and of such length that openings are left whereby the two sidebranches 98, 99 are acoustically coupled to the channel 97 as shown. Said sidebranches 98, 99 are formed by a conical member 100 extending from one end of the conduit 97 to the inside of the casing 96 at a point opposite the other end of the conduit 97 and may be described as being of conico-annular form. These sidebranches, it has been found by experience, conspire to offer maximum attenuation in the main conducting channel to sound frequencies substantially the same as those frequencies which would be highly attenuated by truncated true cones, closed at the small end, open at the base, and having a ratio between the area of the base and the area of the header forming the truncated cone, of 9:1. The impedance of such a truncated cone may be written $$Z_T C = -i\sqrt{P_o \gamma \rho} \left[ \frac{1 + \frac{\omega L}{2C} \cot \frac{\omega L}{C}}{\frac{2}{3\omega L} + \frac{\omega L}{2C} - \frac{2}{3} \cot \frac{\omega L}{C}} \right] \quad (7)$$

The resonating frequencies for such a sidebranch are given by $$-2 \tan \frac{\omega L}{C} = \frac{\omega L}{C} \quad (8)$$

The roots of this equation are found to be approximately $$.73\pi, 1.62\pi, 2.58\pi, 3.57\pi$$

For high frequencies, it is seen that these values approach the value $$\frac{n\pi}{2}$$

where $n$ is odd, and therefore, for high orders of overtones, the device behaves, insofar as attenuation peaks are concerned, substantially as a closed cylindrical sidebranch. The points of zero attenuation may likewise be shown to occur at values of $$\frac{\omega L}{C} = n\pi$$

where $n$ is any integer. Where two such sidebranches are separated a distance L along a main conducting channel, as in Fig. 16, the device forms a wave filter, the transmission and attenuation characteristics of which are given by $$\cosh \Gamma = \cos \frac{\omega L}{C} - \frac{S_2}{2S_1} \sin \frac{\omega L}{C} \left[ \frac{\frac{2}{3\omega L} + \frac{\omega L}{2C} - \frac{2}{3} \cot \frac{\omega L}{C}}{1 + \frac{\omega L}{2C} \cot \frac{\omega L}{C}} \right] \quad (9)$$

A consideration of Fig. 16 further discloses that the larger the ratio $S_2/S_1$, the more nearly the operation of the sidebranch 99 approaches that of a true complete cone, while the operation of the sidebranch 98 approaches that of a cylinder. As has been shown previously, the combination of a cone and cylinder to form acoustic sidebranches results in useful frequency-attenuation characteristics.

Fig. 17 shows a sound wave attenuating device employing a number of conical members nested together at their respective apexes, within the casing 101. The cones 102, 103, 104, 105 and 106 each form a true conical sidebranch coupled to the main conducting channel which in this case is the annular space between the bases of the various cones and the inside of the casing 101. By properly choosing the dimensions for the various components of the device it is possible to offer attenuation to a very wide band of sound frequencies.

In Fig. 18 a similar arrangement of conico-annular sidebranches is shown. The casing 110 houses truncated conical members 111, 112, 113, 114 and 115 each of which has a different degree of conicality. The small ends of the conical members are left open for the passage of gas straight through the device. The conico-annular sidebranches thus formed simulate truncated cones. Suitable choice of dimensions for the various elements of the device results in relatively high attenuation over a wide band of sound frequencies. In this device, as well as in the device of Fig. 17, considerable attenuation to sound waves of high frequency such as hisses and the like is afforded due to the large amount of surface exposed to such sound waves and to the shape of the sidebranches.

Fig. 19 shows a simple constructed sound wave attenuation device having unique acoustic characteristics. It comprises a cylindrical casing 120 and end headers 121 fitted with inlet and outlet openings 122. Suitably mounted within said casing is a cylindrical member 123 open at one end and having a diameter D, cross sectional area $S_2$. The member 123 is closed at the other end by a header 124 having a circular opening therein of diameter $d$ and cross sectional area $S_3$. Affixed to the header 124 is a cone 125 extending coaxially within the cylindrical member 123 and of substantially the same length, as shown. It will be seen that the main conducting channel 126 has coupled to it the conical sidebranch 127 and the conico-annular sidebranch 128. One preferred design embraces a certain relation between $S_3$ and $S_2$. By making $S_3=\frac{3}{4}S_2$ the conico-annular sidebranch becomes approximately equivalent to a truncated cone wherein, referring to Fig. 1, $x_2=2x_1$. Letting $x_2-x_1=L_c$, Equation (1) reduces to $$Z_i=-i\sqrt{P_o\gamma\rho}\left[\frac{1+\frac{\omega L_c}{C}\cot\frac{\omega L_c}{C}}{\frac{1}{2\omega L_c}+\frac{\omega L_c}{C}-\frac{1}{2}\cot\frac{\omega L_c}{C}}\right] \quad (10)$$

and the attenuating effect of a sidebranch operating in accordance with Equation (10), on sound waves in the main conducting channel, may be expressed by $$Ndb=10\log_{10}\left[1+\left(\frac{S_2}{2S_1}\right)^2\left(\frac{\frac{1}{2\omega L_c}+\frac{\omega L_c}{C}-\frac{1}{2}\cot\frac{\omega L_c}{C}}{1+\frac{\omega L_c}{C}\cot\frac{\omega L_c}{C}}\right)^2\right] \quad (11)$$

Figure 29:
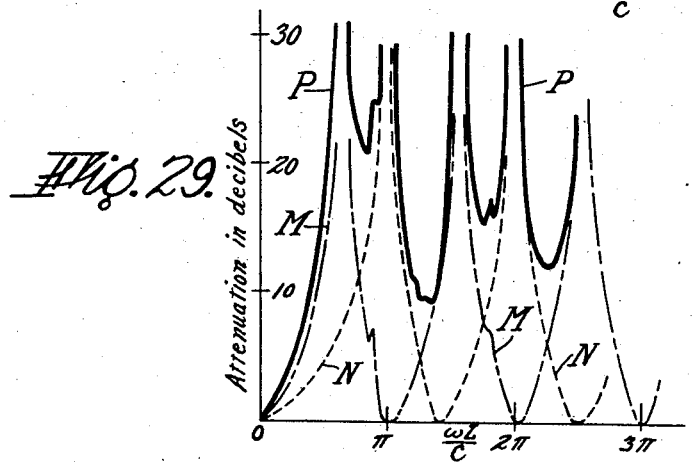

A plot of Equation (11) is shown in Fig. 29, curve M. Curve N, due to the conical sidebranch 127, is similar to that of Fig. 24. The combined effect is shown at P. A feature of the embodiment of the invention shown in Fig. 19 is the short length, made possible by the telescoping of the cone within the cylinder, as shown.

Fig. 20 shows a compact silencer suitable for intakes and the like where but one pipe connection is necessary. It comprises a casing 130 having an imperforate end header 131 and an end header 132 having an opening 133 therein which is large compared to the diameter of a centrally disposed conduit 134 which extends therethrough into the interior of the device, and provides means for attaching the silencer to the apparatus with which it is used. Within the casing 130 is a suitably mounted cylindrical member 135 having openings 136 therein, headers 137 extending from each end of the member 135 to the centrally disposed conduit 134. A conical member 138 extends from one end of the interiorly disposed conduit 134 to the remote end of the cylindrical member 135 substantially as shown. The spacing of the various elements is such as to form the main conducting channel 139 partly as a centrally disposed tubular conduit and partly as an annular conduit. It is seen that this construction affords two sets of acoustical side branches each coupled to the main conducting channel at distant points along its length and that each side branch system comprises two dissimilar conico-annular chambers in parallel. By a suitable use of equations already given and by the proper choice of the dimensions $x_1$, $x_2$, and $x_3$, it is possible to design this device for practically any acoustic performance within limits of the theory.

Fig. 21 shows a device somewhat similar in appearance to that of Fig. 20, but with important acoustical differences. Annular header 140 extending from the interiorly disposed cylindrical casing 141 to the conical member 142 and an annular header 143 extending from the conical member 142 to the centrally disposed conduit 144 together with the casing 145 and suitable openings 146 conspire to form the four acoustical sidebranches 147, 148, 149 and 150 each of which may have different acoustic characteristics. Proper proportioning of the various elements of the device results in a relatively complete attenuation spectrum. In both Figs. 20 and 21 the path of the gases through the device is shown by arrows.

An acoustic wave filter with parallel, unlike, closed acoustic sidebranches is shown in Fig. 22. It comprises a casing 151, a centrally disposed conduit 152, interiorly disposed cones 153, and a header 154, whereby are formed two annular cylindrical closed sidebranches 155 and two conical sidebranches 156. It is seen that one pair of unlike sidebranches is coupled to one end of the conduit 152 and that the other pair of unlike sidebranches is coupled thereto at the other end thereof. For the condition that $L_1=L_2=L_3=L_4$, the operating characteristics may be determined by $$\cosh \Gamma=\cos\frac{2\omega L}{C}+\frac{S_2}{2S_1}\sin\frac{2\omega L}{C}\left[\cot\frac{\omega L}{C}-\tan\frac{\omega L}{C}-\frac{1}{\frac{\omega L}{C}}\right] \quad (12)$$

By making the various $L$'s of different values, the acoustic properties of the device may be changed at will. Experience has shown that this type of device may be designed to have very low back-pressure in spite of the fact that the gas follows an apparently tortuous pathway therethrough. The space between the outside of the cones 153 and the shell 151 may be used as described in connection with Figs. 3 and 5.

Fig. 23 depicts an embodiment of the invention where use is made of both conical sidebranches and simulated truncated conical sidebranches. It comprises essentially an acoustic wave filter, formed by the center section D, similar to the embodiment of Fig. 8 in conjunction with the units E which are somewhat similar to the embodiment of Fig. 19. Acoustically, it comprises a main conducting channel 160 having coupled thereto at distant points along the length thereof two sidebranch systems, each comprising a conical sidebranch 161 in parallel with a conical sidebranch 162. In addition, two conico-annular sidebranches 163 are also coupled to the main conducting channel at points near the inlet and outlet of the device. The constructional features involve a cylindrical casing 164 having a central section in which is suitably mounted a pair of cones 165 as described in connection with the device of Fig. 8, two end sections in which are suitably mounted the sidebranches 162, 163 formed by a concentrically disposed cylindrical member 166 and an interiorly telescoped conical member 167, the base of which joins the inward end of the member 166. The interior headers 168 are arbitrary and their purpose is to bend the main conducting channel in to the center of the device through openings 169 therein whereby the open bases of the conical sidebranches 161, 162 are brought into closer acoustic relation with the main conducting channel 160. For an acoustic wave filter having conical sidebranches of length L and L/2 paralleled at a distance L apart along the main conducting channel, as shown, the operating characteristics may be shown to be given by $$\cosh \Gamma = \cos \frac{\omega L}{C} + \frac{S_2}{2S_1} \sin \frac{\omega L}{C} \left[ \cot \frac{\omega L}{C} + \cot \frac{\omega L}{2C} - \frac{3}{\omega L / C} \right] \quad (13)$$

Figure 27:
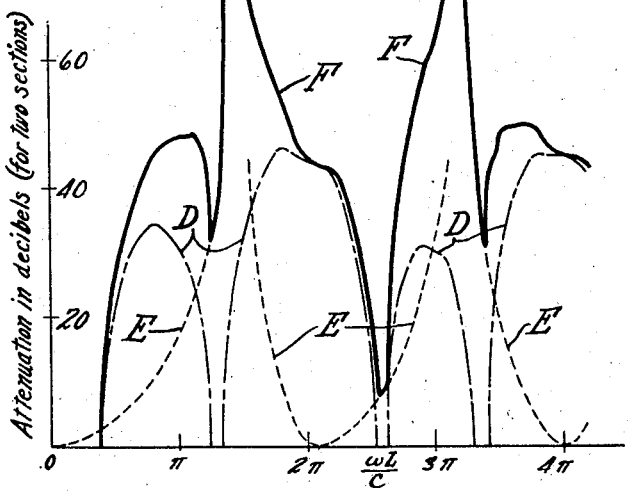
Figure 28:
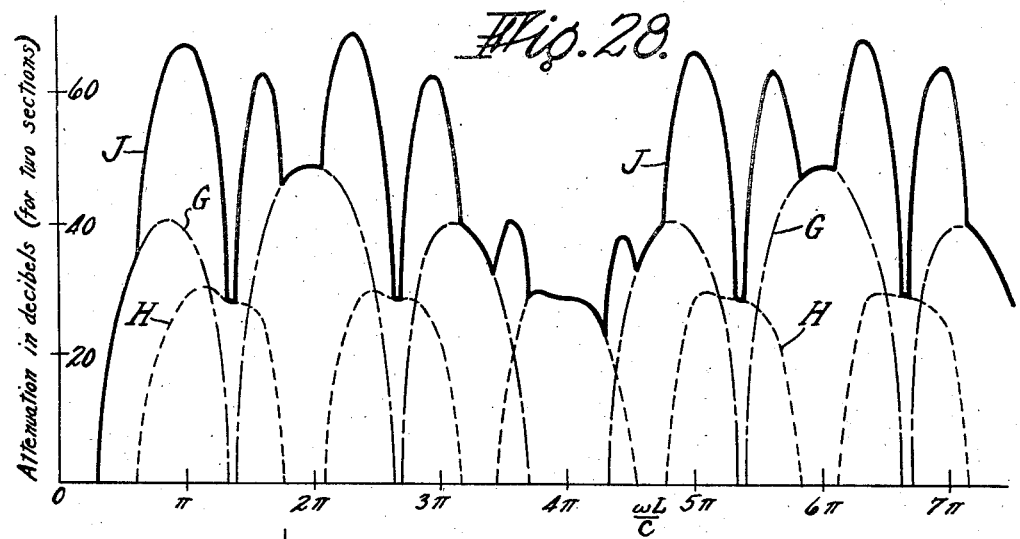

A plot of Equation 13 is shown in Fig. 27, curve D. The attenuating action of sidebranches 163 is given approximately by $$Ndb = 10 \log_{10} \left[ 1 + \left( \frac{S_2}{2S_1} \right)^2 \left( \frac{\frac{4}{3\omega L / C} + \frac{\omega L}{4C} - \frac{2}{3} \cot \frac{\omega L}{2C}}{1 + \frac{\omega L}{4C} \cot \frac{\omega L}{2C}} \right)^2 \right] \quad (14)$$

The equation is plotted as curve E in Fig. 27 and the combined effect of D and E is plotted at F. By omitting the headers 168 or by having suitable drain holes near the periphery thereof, the device becomes suitable for service where water is introduced into the exhaust system such as is common practice in many marine installations.

No attempt has been made to set down all the possible combinations involving cones of one form or another used as side branches. Many others will be apparent to those skilled in the art.

I claim:

1. An acoustic silencer comprising a main sound channel and one or more closed sidebranches acoustically coupled to the channel and having a cross sectional area decreasing progressively with the distance from a zone adjacent its coupling to the closed end of the sidebranch.

2. An acoustic silencer comprising a main sound channel and one or more closed sidebranches acoustically coupled to the channel and having a cross sectional area decreasing progressively with the distance from its coupling to the channel to substantially zero area at the closed end of the sidebranch.

3. An acoustic silencer comprising a main sound channel and one or more closed sidebranches acoustically coupled to the channel and formed in the shape of a complete circular cone open to the sound channel at its base.

4. An acoustic silencer comprising a main sound channel and one or more closed sidebranches acoustically coupled to the channel and having a cross sectional area decreasing progressively with the distance from the point of coupling to the channel, the area of coupling between the sidebranch and the channel being greater than the area of the main channel.

5. An acoustic silencer comprising a main sound channel and one or more closed sidebranches acoustically coupled to the channel and formed in the shape of a complete circular cone open to the main channel at its base, the cross sectional area of the base being of the order of four times the area of the main channel.

6. An acoustic silencer comprising a conduit and one or more members each located within the conduit so as to provide a main sound conducting channel between it and the adjacent wall of the conduit, each of said members being formed as a hollow complete circular cone open at its base.

7. An acoustic silencer comprising a conduit and a pair of oppositely facing, overlapping, circular cones open at their bases and located within the conduit so as to form a sound conducting channel between them and the adjacent wall of the conduit.

8. In an acoustic silencing device having a main sound conducting channel, a closed conical sidebranch having its open base acoustically coupled to said channel.

9. In an acoustic silencing device having a main sound conducting channel, a sidebranch having a cross sectional area decreasing progressively with the distance from its point of coupling to the main channel, having a form sufficiently slender to cause it to give substantial attenuation to its fundamental frequency and at least one consecutive overtone, and having a coupling opening into the main channel sufficiently large to cause the sidebranch to operate mainly as a linear acoustic element.

10. A closed acoustic side branch of the wave motion or phase displacement type having natural frequencies related to each other as 1:2:3:4 etc.

11. An acoustic side branch acoustically coupled to an enclosure, said sidebranch offering attenuation, in said enclosure, to sound waves of a full harmonically related integral series of frequencies, but offering substantially zero attenuation to sound waves of zero frequency.

12. A closed acoustic sidebranch acoustically coupled to an enclosure in which sound waves may travel, said sidebranch being of appreciable length compared to the wave lengths of the sounds which it is adapted to attenuate in said enclosure, the cross sectional area of said sidebranch being directly proportional to the square of the distance measured from one end thereof.

13. A closed acoustic sidebranch in accordance with claim 12 wherein said sidebranch is acoustically coupled to said enclosure at the point of maximum cross sectional area of said sidebranch.

14. An acoustic wave filter comprising a sound conducting channel, a plurality of closed acoustic sidebranches in the form of complete cones of equal length open at the respective bases thereof, said sidebranches being acoustically coupled to said sound conducting channel at intervals along the length thereof equal to the length of said conical sidebranches.

15. An acoustic wave filter in accordance with claim 14 wherein the cross sectional area of the bases of said conical sidebranches is appreciably greater than the cross sectional area of the sound conducting channel to which said sidebranches are acoustically coupled.

16. A sound wave attenuating device comprising a generally cylindrical casing having a gas inlet at one end and a gas outlet at the other end, a pair of complete cones nested therewithin, the bases of said cones being at opposite ends of said casing and a gas passing and sound conducting channel formed between the inside of said casing and the outside of said interiorly nested cones, said cones forming closed acoustic sidebranches acoustically coupled to said sound channel at either end of said casing.

17. A silencer for the exhausts or intakes of internal combustion engines comprising a generally cylindrical casing having an inlet opening at one end and an outlet opening at the other end, an interiorly disposed, co-axially mounted, open base cone extending from a point adjacent one of said openings to a point adjacent the other of said openings, whereby is formed a sound and gas conducting channel largely exterior to said interiorly disposed cone, a closed acoustic conical sidebranch coupled to said sound conducting channel at the large end thereof, said sidebranch being capable of attenuating, in said sound conducting channel, sound waves of a full integral series of harmonically related frequencies corresponding to and depending upon the natural frequencies of said sidebranch.

18. A silencer in accordance with claim 17 wherein, in the space between the outside of said cone and the inside of said casing, is positioned means for attenuating sound waves of high frequency compared to the frequency of the sound waves attenuated by said cone.

19. A silencer in accordance with claim 17 wherein a series of discs, spaced apart longitudinally, and of smaller diameter than the casing of said silencer is mounted exteriorly of said cone and attached thereto.

20. An acoustic wave filter comprising a cylindrical casing having nested therewithin a pair of equal open base complete cones of smaller diameter and shorter length than said casing, the apex of one cone being at the base of the other, whereby is formed a sound conducting channel exteriorly of said cones, each cone being acoustically coupled at its base to said sound conducting channel at a distance apart along said channel substantially equal to the length of said cones.

21. An acoustic wave filter having pass bands in substantially harmonic relation as 1:2:3: etc., and means for providing selective attenuation for sound frequencies comprising said pass bands.

22. An acoustic wave filter having pass bands, which form an integral series of frequencies as 1:2:3: etc., and one or more additional acoustic sidebranches acoustically coupled to the main sound conducting channel of said wave filter, said additional sidebranch or sidebranches offering relatively high attenuation only to those sound frequencies comprising said series passed by said filter and to all of them.

23. A composite acoustic attenuating device comprising a plurality of units, each having sidebranches of the closed type only, so designed and arranged that a relatively small amount of attenuation is offered by one of said units to frequencies for which another of said units offers relatively high attenuation and wherein one of said units offers high attenuation to those sound frequencies for which another of said units offers substantially no attenuation.

24. A sound attenuating device comprising a sound conducting channel having acoustically coupled thereto at intervals along the length thereof, closed acoustic sidebranches which conspire to offer attenuation, in said sound conducting channel, to all sound frequencies from zero to infinity, the frequencies suffering maximum attenuation bearing the relation to each other as 1:2:3: etc.

25. A sound attenuating device comprising a sound conducting channel having acoustically coupled thereto at intervals along the length thereof, closed acoustic sidebranches which conspire to offer high attenuation, in said sound conducting channel, to a full integral series of harmonically related sound frequencies and to offer substantial attenuation to sound frequencies intermediate said integral series of frequencies.

26. A sound attenuating device in accordance with claim 25 wherein the frequencies of maximum attenuation of no sidebranch corresponds to the frequencies of maximum attenuation of any other sidebranch.

27. A composite acoustic wave filter comprising a main sound conducting channel having acoustically coupled thereto, at equal intervals along the length thereof a pair of closed cylindrical sidebranches in parallel, one of each pair of closed cylindrical sidebranches being twice as long as the other of said pair, each of said pairs being separated along said channel a distance equal to twice the length of the longer of said closed cylindrical sidebranches comprising said pair, and one or more complete closed cones, open at the base acoustically coupled to said channel at a point or points along the length thereof exterior to that portion of said channel which is in communication with said pairs of closed cylindrical sidebranches, the length of said complete closed cones being three quarters of the length of said main sound conducting channel between said pairs of closed cylindrical sidebranches.

28. A composite acoustic wave filter in accordance with claim 27 wherein the cross sectional area of each of the closed acoustic sidebranches, measured at the point at which they are respectively coupled to said channel, is appreciably greater than the cross sectional area of said channel.

29. A sound attenuating device comprising a main sound conducting channel having acoustically coupled thereto, at intervals along the length thereof, a series of closed acoustic sidebranches wherein wave motion or change of phase occurs said series comprising a complete closed cone, open at its base and one or more closed cylindrical sidebranches, the length of said cone bearing the relation to the lengths of the cylindrical sidebranches as 1:1:2:4: etc.

30. A silencing device comprising a cylindrical casing having an inlet opening at one end and an outlet opening at the other end, a partition dividing the interior of said casing into two compartments, a conduit extending from an opening in said partition coaxially through one of said compartments to a point adjacent one of the openings in said casing whereby is formed a closed cylindrical acoustic sidebranch acoustically coupled to the sound conducting channel formed by said conduit at a point adjacent one end of said casing, a complete closed cone with open base interiorly disposed within the other of said compartments and so proportioned and mounted that its open base is adjacent the inner end of said coaxially disposed conduit and that a sound conducting channel is formed between the outside of said cone and the inside of said casing.

31. A silencing device in accordance with claim 30 wherein the closed cylindrical sidebranch and closed conical sidebranch are of substantially equal length.

32. A sound attenuating device comprising a cylindrical casing, a coaxial conduit extending therethrough and a pair of closed, coaxially disposed acoustic sidebranches coupled to said conduit at the ends thereof, said sidebranches having a continuously decreasing cross sectional area as a function of the distance from the respective coupling points and having a length substantially equal to the distance between said coupling points.

33. A sound attenuating device comprising a main sound conducting channel, closed acoustic sidebranches coupled thereto at points along the length thereof, one of said sidebranches decreasing in cross sectional area to zero continuously in a direction away from its point of coupling to said channel and another of said sidebranches decreasing continuously to a value appreciably greater than zero.

34. A sound attenuating device in accordance with claim 33 wherein the two different sidebranches are of substantially the same length.

35. A sound attenuating device comprising a cylindrical casing having openings in the ends thereof, an interiorly and co-axially disposed cylindrical member of shorter length and less diameter than said casing, said interior cylinder being open at one end and closed at the other end by an annular header having an opening therein which communicates with the open base of a complete cone inwardly extending from said opening.

36. A sound attenuating device in accordance with claim 35 in which said cylinder and cone are proportioned to form two closed acoustic sidebranches one of which offers attenuation to a series of bands of sound frequencies bearing the relation 1:2:3:4, etc. and the other of which offers attenuation to a series of bands of sound frequencies intermediate the first named series.

37. A sound attenuation device comprising a main sound channel and a plurality of sidebranch units spaced apart along the length of said channel, each of said side branch units comprising one or more closed acoustic sidebranches, the sidebranches of each unit offering maximum attenuation for every zone of minimum attenuation excepting that at or near zero frequency, of the other groups.

38. A sound attenuation device comprising a main sound channel and a plurality of sidebranch units spaced apart along the length of said channel, each sidebranch unit comprising one or more closed acoustic sidebranches, the sidebranches of each unit offering maximum attenuation for every zone of minimum attenuation excepting that at or near zero frequency, of the other groups, and the attenuation bands of the two units overlapping so that no pass bands exist, excepting at or immediately adjacent to zero frequency.

39. In combination, a main sound conducting channel comprising a generally cylindrical portion and a generally annular portion connected in series, and a closed acoustic sidebranch of the phase displacement type having its open end in adjacency to and facing the opening into said cylindrical portion, at the junction point between said portions.

40. An acoustic silencing device comprising a conduit having a region in which its diameter changes, and a closed acoustic sidebranch located within the larger portion of the conduit and opening towards the smaller portion thereof.

41. A sound attenuating device having two or more closed sidebranches wherein progressive change of phase takes place, said sidebranches being coupled to a main sound conducting channel at intervals along its length, one of said sidebranches offering maximum attenuation in said channel to sound frequencies for which another of said sidebranches offers minimum attenuation.

42. A sound attenuating device comprising a casing having an inlet opening at one end thereof and an outlet opening at the other end thereof and a closed sidebranch in the form of a complete cone open at its base positioned in adjacency to said outlet opening.

43. A sound wave attenuating device comprising a main acoustic channel and a plurality of annularly nested sidebranches, each having at least one conical wall, and being acoustically coupled to the main channel.

44. A sound wave attenuating device comprising a main acoustic channel and a plurality of annularly nested sidebranches, at least one of said nested sidebranches being of conico-annular form.

45. A sound wave attenuating device comprising a casing and a plurality of chamber defining members arranged within said casing in annularly nested relation, at least one of said members being annular in form.

46. An acoustic silencing device comprising a casing, an acoustic conduit extending partially through the casing, one or more acoustic sidebranches positioned between the conduit and the casing and acoustically coupled to the conduit, and a cone-shaped member with open base positioned between the conduit and the casing so as to provide an annular channel between it and the casing and with its open end located adjacent the end of the conduit.

47. An acoustic silencing device comprising a casing having inlet and outlet openings, an acoustic conduit extending partially through the casing, one or more acoustic sidebranches positioned between the conduit and the casing and acoustically coupled to the conduit, and a cone-shaped member with open base positioned between the conduit and the casing so as to provide an annular channel between it and the casing and with its open end located adjacent one of said openings.

48. An acoustic silencing device comprising a casing having inlet and outlet openings, an acoustic conduit extending partially through the casing, one or more acoustic sidebranches positioned between the conduit and the casing and acoustically coupled to the conduit, and a cone-shaped member with open base positioned between the conduit and the casing so as to provide an annular channel between it and the casing and with its open end located adjacent said exhaust opening.

49. An acoustic silencing device comprising a casing having inlet and outlet openings, a main acoustic channel formed within the casing so as to suffer an abrupt change in direction, and a sidebranch having a cross-sectional area increasing progressively from one closed end and having acoustic coupling to the main acoustic channel adjacent the latter's change in direction and remote from the closed end of the sidebranch.

50. An acoustic silencing device comprising a casing having inlet and outlet openings, a conduit formed centrally within the casing so as to comprise a portion of a main acoustic channel, and a sidebranch with one end closed mounted concentrically within the casing so as to form an annular conduit comprising a second portion of the main acoustic channel, said sidebranch being placed with its open end adjacent to the junction between the central and the annular portions of the main acoustic channel.

51. An acoustic silencing device comprising a casing having inlet and outlet openings, a conduit having a portion extending centrally partway through the casing, and a sidebranch closed at one end and having its open end adjacent the end of the central portion of the conduit.

52. An acoustic silencing device comprising a casing having inlet and outlet openings, a main acoustic channel formed within the casing so as to suffer an abrupt change in direction, and a sidebranch in the form of a complete circular cone open at its base and having its open end acoustically coupled to the main acoustic channel adjacent the latter's change in direction.

53. An acoustic silencer comprising a sound conducting channel having an annular form for at least a portion of its length, and an acoustic sidebranch in the form of a complete cone closed at its apex and acoustically coupled to the channel at its base, said sidebranch being located inwardly of the annular portion of the channel.

54. A sound attenuating device comprising a sound conducting channel having an annular form for at least a portion of its length, and a plurality of closed acoustic sidebranches acoustically coupled to said channel and located inwardly of the annular portion thereof, at least one of said sidebranches being in the form of a complete cone closed at its apex and coupled to the channel at a point adjacent its base.

55. A sound attenuating device comprising a sound conducting channel having an annular form for at least a portion of its length, and a closed acoustic side branch of the phase displacement type acoustically coupled thereto and located inwardly of the annular portion thereof, the cross sectional area of said side branch decreasing continuously as a function of distance from the region of its coupling to the channel.

56. A sound attenuating device having a generally cylindrical casing with openings at either end thereof, a closed conical side branch disposed longitudinally within said casing, and means, positioned in the space between the inside of said casing and the outside of said conical side branch, for attenuating sound frequencies other than those for which said conical side branch offers substantial attenuation.

57. A sound attenuating device comprising acoustic wave filters in series, each of said filters having pass bands, and one of said filters offering substantial attenuation to a band of frequencies lying in a pass band of another of said filters.

ROLAND B. BOURNE.

Certificate of Correction

Patent No. 2,017,744.  October 15, 1935.

ROLAND B. BOURNE

It is hereby certified that error appears in the printed specification of the above numbered patent requiring correction as follows: Page 5, first column, line 67, equation (7), for the introductory letters at the extreme left of equation, "ZrC", read *Zrc*; and page 8, second column, line 51, claim 29, after "occurs" insert a comma; and that the said Letters Patent should be read with these corrections therein that the same may conform to the record of the case in the Patent Office.

Signed and sealed this 5th day of November, A. D. 1935.

[SEAL]

LESLIE FRAZER,
*Acting Commissioner of Patents.*

DISCLAIMER 2,017,744.—*Roland B. Bourne*, Hartford, Conn. SOUND ATTENUATING DEVICE. Patent dated October 15, 1935. Disclaimer filed May 24, 1940, by the assignee, *The Maxim Silencer Company*.

Hereby enters this disclaimer to claims 1, 2, 3, 6, 8, and 53 in said patent.

[*Official Gazette June 25, 1940.*]